United States Patent
Chellapilla et al.

(10) Patent No.: US 7,505,946 B2
(45) Date of Patent: Mar. 17, 2009

(54) HIGH PERFORMANCE CONTENT ALTERATION ARCHITECTURE AND TECHNIQUES

(75) Inventors: Kumar H. Chellapilla, Sammamish, WA (US); Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1256 days.

(21) Appl. No.: 10/815,086

(22) Filed: Mar. 31, 2004

(65) Prior Publication Data

US 2005/0229251 A1 Oct. 13, 2005

(51) Int. Cl.
G06F 17/00 (2006.01)
G06F 17/20 (2006.01)

(52) U.S. Cl. ..................................................... 706/11
(58) Field of Classification Search ........................ None
See application file for complete search history.

(56) References Cited

U.S. PATENT DOCUMENTS

| | | | |
|---|---|---|---|
| 6,195,698 B1 | 2/2001 | Lillibridge et al. | |
| 7,139,916 B2 * | 11/2006 | Billingsley et al. | 713/182 |
| 7,200,576 B2 * | 4/2007 | Steeves et al. | 705/64 |
| 7,337,324 B2 * | 2/2008 | Benaloh et al. | 713/182 |
| 7,356,120 B2 * | 4/2008 | Main et al. | 378/65 |
| 7,360,092 B1 * | 4/2008 | Peterson et al. | 713/175 |
| 7,406,453 B2 * | 7/2008 | Mundie et al. | 706/20 |

OTHER PUBLICATIONS

Identifying child users: Is it possible? Shirali-Shahreza, Sajad; Shirali-Shahreza, Mohammad; SICE Annual Conference, 2008 Aug. 20-22, 2008, pp. 3241-3244 Digital Object Identifier 10.1109/SICE. 2008.4655224.*

Design and Implementation of Three Different Methods for Announcing Exam Grades on the Web Shirali-Shahreza, M.; Advanced Learning Technologies, 2008. ICALT '08. Eighth IEEE International Conference on Jul. 1-5, 2008 pp. 335-337 Digital Object Identifier 10.1109/ICALT.2008.9.*

Exam HIP Shirali-Shahreza, S.; Shirali-Shahreza, M.; Movaghar, A.; Anti-counterfeiting, Security, Identification, 2007 IEEE International Workshop on Apr. 16-18, 2007 pp. 415-418 Digital Object Identifier 10.1109/IWASID. 2007.373668.*

(Continued)

*Primary Examiner*—Michael B Holmes
(74) *Attorney, Agent, or Firm*—Amin, Turocy & Calvin, LLP

(57) ABSTRACT

The present invention provides a unique system and method that facilitates obtaining high performance and more secure HIPs. More specifically, the HIPs can be generated in part by caching pre-rendered characters and/or pre-rendered arcs as bitmaps in binary form and then selecting any number of the characters and/or arcs randomly to form a HIP sequence. The warp field can be pre-computed and converted to integers in binary form and can include a plurality of sub-regions. The warp field can be cached as well. Any one sub-region can be retrieved from the warp field cache and mapped to the HIP sequence to warp the HIP. Thus, the pre-computed warp field can be used to warp multiple HIP sequences. The warping can occur in binary form and at a high resolution to mitigate reverse engineering. Following, the warped HIP sequence can be down-sampled and texture and/or color can be added as well to improve its appearance.

63 Claims, 7 Drawing Sheets

OTHER PUBLICATIONS

A New Human Interactive Proofs System for Deaf Persons Shirali-Shahreza, S.; Shirali-Shahreza, M.; Information Technology: New Generations, 2008. ITNG 2008. Fifth International Conference on Apr. 7-9, 2008 pp. 807-810 Digital Object Identifier 10.1109/ITNG.2008.17.*

Restricted Access to Exam Grades on the Web by HIP Shirali-Shahreza, S.; Shirali-Shahreza, M.; Movaghar, A.; Computer and Information Science, 2007. ICIS 2007. 6th IEEE/ACIS International Conference on Jul. 11-13, 2007 pp. 967-971 Digital Object Identifier 10.1109/ICIS.2007.158.*

A human interactive proof algorithm using handwriting recognition Rusu, A.; Govindaraju, V.; Document Analysis and Recognition, 2005. Proceedings. Eighth International Conference on Aug. 29-Sep. 1, 2005 pp. 967-971 vol. 2 Digital Object Identifier 10.1109/ICDAR.2005.18.*

ScatterType: a legible but hard-to-segment Captcha Baird, H.S.; Moll, M.A.; Sui-Yu Wang; Document Analysis and Recognition, 2005. Proceedings. Eighth International Conference on Aug. 29-Sep. 1, 2005 pp. 935-939 vol. 2 Digital Object Identifier 10.1109/ICDAR.2005.205.*

Breaking the clock face HIP [Web services human interactive proofs] Zhenqiu Zhang; Yong Rui; Huang, T.; Paya, C.; Multimedia and Expo, 2004. ICME '04. 2004 IEEE International Conference on vol. 3. Jun. 27-30, 2004, pp. 2167-2170 vol. 3.*

Handwritten Captcha: using the difference in the abilities of humans and machines in reading handwritten words Rusu, A.; Govindaraju, V.; Frontiers in Handwriting Recognition, 2004. IWFHR-9 2004. Ninth International Workshop on Oct. 26-29, 2004 pp. 226-231 Digital Object Identifier 10.1109/IWFHR.2004.54.*

Using character recognition and segmentation to tell computer from humans Simard, P.Y.; Szeliski, R.; Benaloh, J.; Couvreur, J.; Calinov, I.; Document Analysis and Recognition, 2003. Proceedings. Seventh International Conference on Aug. 3-6, 2003 pp. 418-423 vol. 1.*

U.S. Appl. No. 10/373,926, filed Feb. 25, 2003, Chellupilla et al.

European Search Report dated Jul. 13, 2007, mailed Jul. 27, 2007, for European Patent Application Serial No. 05102061, 4 pages.

Simard, et al. "Using Character Recognition and Segmentation to tell Computers from Humans" (2003) Proceedings of the 7th International Conference of Document Analysis and Recognition, pp. 418-423.

Xu, et al. "Mandatory Human Participation: A New Authentication Scheme for Building Secure Systems" (2003) Proceedings of the 12th International Conference of Computer Communications and Networks, pp. 547-552.

Von Ahn, et al. "Telling Humans and Computers Apart Automatically" (2004) ACM February vol. 47, No. 2, pp. 57-60.

Luis Von Ahn, et al., Telling Humans and Computers Apart (Automatically) or How Lazy Cryptographers do AI, Communications of the ACM, Feb. 2004, 11 pages.

Patrice Y. Simard, et al., Using Character Recognition and Segmentation to Tell Computers from Humans, ICDAR 2003, 2003, pp. 418-423.

First Workshop on Human Interactive Proofs, Jan. 9-11, 2002, 5 pages, Palo Alto, California, USA.

H.S. Baird, et al., Human Interactive Proofs and Document Image Analysis, Proc. IAPR 2002, 2002, 12 pages, Workshop on Document Analysis Systems, Princeton, New Jersey, USA.

Luis Von Ahn, et al., Telling Humans and Computers Apart(Automatically), The Captcha Project 2000, 3 pages, http://www.captcha.net.

Paypal, an eBay Company, 1999, 1 page.

A.M. Turing, Computing Machinery and Intelligence, Mind, 1950, pp. 433-460, vol. 59-No. 236.

* cited by examiner

HIGH PERFORMANCE CONTENT ALTERATION ARCHITECTURE AND TECHNIQUES

TECHNICAL FIELD

The present invention relates generally to human interactive proofs and in particular, to improving the fabrication and generation speed of human interactive proofs to facilitate increasing their effectiveness in distinguishing computer-based action from human action.

BACKGROUND OF THE INVENTION

The advent of global communications networks such as the Internet has presented commercial opportunities for reaching vast numbers of potential customers. In the past several years, users have turned to the Internet as a reliable source of news, research resources, and various other types of information. In addition, online shopping, making dinner reservations, and buying concert and/or movie tickets are just a few of the common activities currently conducted while sitting in front of a computer by way of the Internet. However, the widespread use of the Internet by businesses as well as private consumers can lead to unwanted or even undesirable exposure to a variety of economic risks and/or security weaknesses.

With respect to online businesses, security and the validity of buyers making online purchases or reservations have become main concerns. For example, many restaurants provide an online reservation service wherein customers can make their reservations via the Internet using the restaurants' websites. Unfortunately, this system makes restaurant owners somewhat vulnerable to dinner service attacks—which are but one type of automated script attack. Such attacks occur when a computer makes several hundred, if not more, fake online reservations affecting a large number of restaurants. As a result of such an attack, these businesses can be interrupted or even damaged due to loss revenues, system repairs and clean-up costs, as well as the expenses associated with improving network security.

Another type of attack can be in the form of a spam attack. Spam attacks can be made to target one entity such as a particular business or thousands of users randomly selected according to their email addresses. In general, spam has become a fast-growing problem due to the rising popularity of email usage. As is well known, electronic messaging is becoming increasingly pervasive as a means for disseminating unwanted advertisements and promotions (e.g., spam) to network users. Widespread spam dissemination to hundreds or thousands of users or even to a single entity at a time can be attributed to the use of automated actions taken by computers. For example, spammers can program computers to create or open dozens and dozens of different email accounts from legitimate message service providers such as on a daily or weekly basis. By doing this, they can ensure that their spam is delivered to as many recipients as possible, even if one or two accounts are shut down from time to time.

The Radicati Group, Inc., a consulting and market research firm, estimates that as of August 2002, two billion junk email messages are sent each day—this number is expected to triple every two years. Individuals and entities (e.g., businesses, government agencies) are becoming increasingly inconvenienced and oftentimes offended by spam (junk messages). As such, spam is now or soon will become a major threat to trustworthy computing.

Moreover, the rapid growth and development of the Internet has introduced new avenues for fraudulent, disruptive, and/or damaging activities to occur. As a means to thwart spam and automated script attacks, some online businesses as well as messaging services have implemented the use of computational challenges or human interactive proofs (HIPs). Such techniques allow computers to distinguish human users from computer users.

Work on distinguishing between computers and humans traces back to the original Turing Test which asks that a human distinguish between another human and a machine by asking questions of both. Recent interest has turned to developing systems that allow a computer to distinguish between another computer and a human to enable the construction of automatic filters to prevent automated scripts from utilizing services intended for humans. Such systems have been termed Human Interactive Proofs (HIPs) or Completely Automated Public Turing Tests to Tell Computers and Humans Apart (CAPTCHAs). For example, HIPs can rely on recognizing characters that are placed along with noise and/or background wherein the challenge is to correctly identify all presented characters.

Unfortunately, the current HIP systems can be faulty in that characters placed together with random arcs may be arranged in such a way that the arcs interfere with human perception. Thus, it can be very difficult for humans to distinguish the characters. Hence, the conventional HIP can be rather ineffective at barring access to computers and granting access to humans.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method that facilitate distinguishing computer users from human users in part by increasing the effectiveness as well as the generation speed of human interactive proofs (challenges). Unlike conventional HIPs, the system and method of the present invention can mitigate the probability of generating unsolvable or impossible challenges in part by reducing the randomness with which arcs and/or other clutter are arranged about or combined with a HIP sequence. Furthermore, relatively large speed-up gains can be achieved in part by modifying the requisite computations in such a way that allows many relevant quantities to be pre-computed. Finally, the visual appeal of the subject HIPs can be further enhanced such as by warping the HIP at a high resolution and then down-sampling the HIP. The warped HIP sequence can also be combined with one or more textures and/or color to improve the look of the finished HIP.

According to one aspect of the invention, a large two-dimensional warp field can be pre-computed and discretized or converted into integers such that each pixel represented thereon can have two integers associated therewith—one for each of the x- and y-dimension. The dimensions of the warp field can be several times that of a single HIP image and comprise a plurality of sub-regions. The sub-regions of the warp field can be used to warp individual HIPs. For example, a sub-region can be randomly or manually selected and employed to stretch, rotate, and/or distort various portions of a HIP. Hence, the same warp field can be used multiple times to warp a plurality of HIPs. This allows for a greater number of unique HIPs to be generated in a substantially shorter amount of time.

According to another aspect of the present invention, the HIP generation process can also be enhanced by pre-rendering and caching any number of characters (e.g., letters and/or numbers) available for use in the HIPs. For example, the rotated and scaled versions of all 26 characters of the English alphabet can be cached. When initiating a HIP fabrication process, any given number of characters can be randomly selected from the cache of characters. The character or font cache can become relatively large due at least in part to the number of HIPs desired for employment. However, populating the cache at startup can be very time-consuming. Hence, in the interest of time and efficiency, characters shown in fabricated HIPs can be parsed from the HIP and saved in the font cache to assist in building up the cache over time (e.g., lazy cache population).

The arcs as well as other random clutter can be pre-rendered and cached as well to facilitate quicker retrieval when generating HIPs. The pre-rendered arcs can be maintained in another cache (e.g., arc cache), which can be built upon startup since not as many arcs as characters may be needed to generate the desired number of HIPs. The arcs and/or clutter can be randomly selected to be placed with the text of a HIP in a random manner. The random placement of the arcs or other clutter can be generated in part by using low discrepancy quasi-random numbers. In general, this can maximize interference with the generated text when multiple clutter objects are generated. As a result, the appearance of the HIP as well as its readability by humans can be improved since most, if not all, of the arcs or clutter combined with the text of the HIP may be more evenly dispersed across the text.

In still another aspect of the invention, the performance of the HIP can be improved by generating the HIP in binary. That is, the characters, arcs, and/or other clutter can be pre-rendered in binary form (e.g., black and white) which provides an additional gain in HIP generation speed (e.g., warp speed). Furthermore, fabricating the HIPs in binary can also provide additional security to mitigate reverse engineering of the HIPs by hackers and their computers.

Texture and/or colors (e.g., background and/or foreground colors) can also be added to the HIP to further improve its appearance and/or to customize the HIP according to user preferences. For example, various colors can be added to the foreground (e.g., text, arcs, clutter) or background depending on seasonal holidays, targeted human users, and the like. Customization processing can be rather taxing on server processors (central processing units of servers). Thus, graphical processing units in addition to MMX, SSE, and SSE2 technologies located on the client can be employed to perform such customization of HIPs to further optimize HIP generation rates. In addition, these types of technologies can be used to combine pre-rendered character bitmaps with pre-rendered arc bitmaps.

Moreover, the various aspects of the present invention work together or alone or in combination with one another to enhance the quality and value of HIPs generated and employed and perhaps more importantly, to thwart automated script attacks, spam attacks, and spam dissemination in general.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
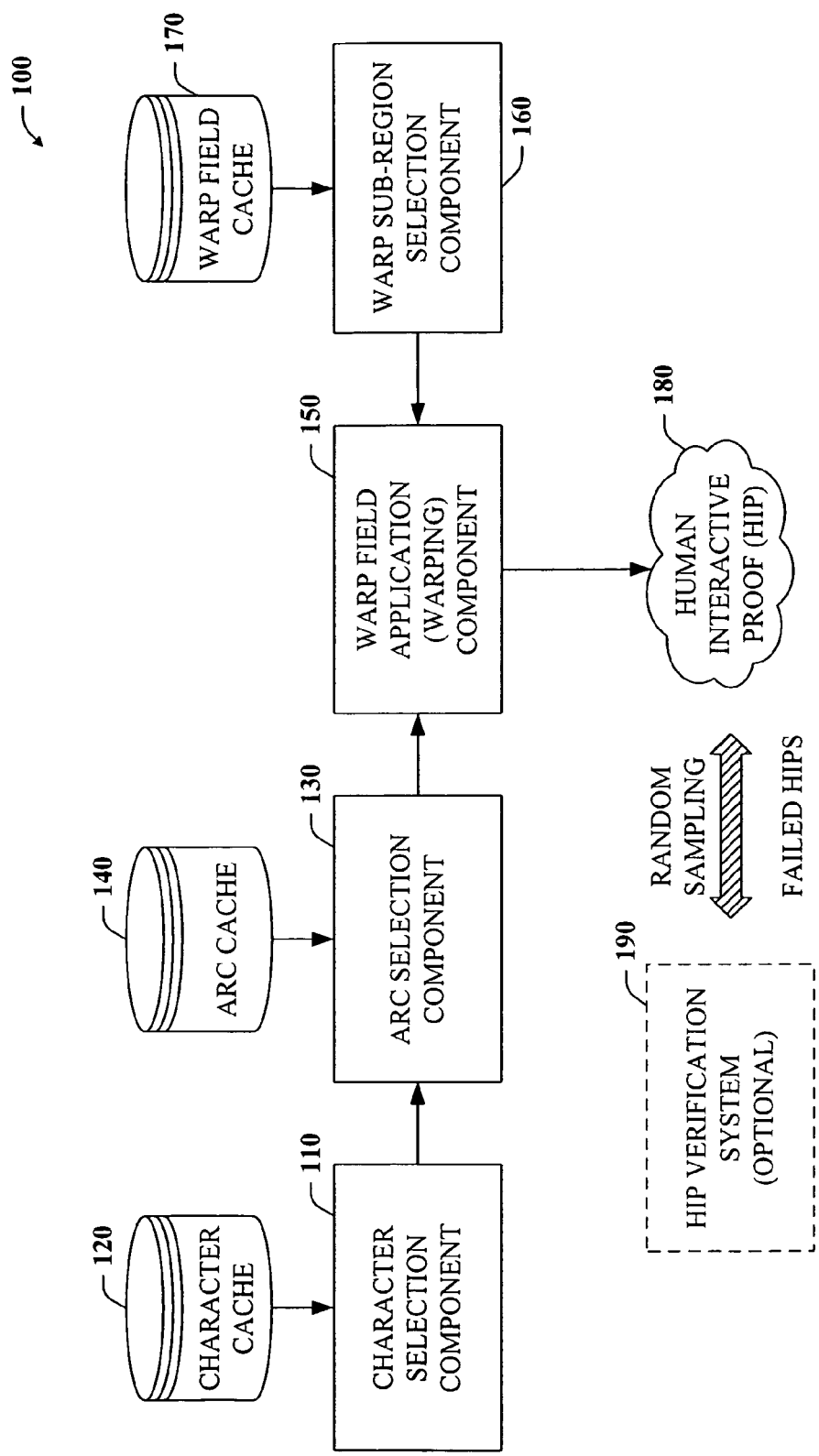
FIG. 1 is a block diagram of a HIP generation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, the terms "computer user" and "human user" as employed in this application are intended to refer to a non-human user such in the case where computers are programmed to take actions such as initiating automated script attacks, sending hundreds or thousands of spam to various recipients as well as to specific recipients with an intent to attack the recipients' network or servers and to cause disruption to their business or service.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The present invention can be based on two very challenging vision problems: segmentation and recognition of objects. With respect to segmentation, humans can usually evaluate any given scene by segmenting it into pieces. For example, when shown a picture of a furnished room, they can acknowledge or identify distinct parts or contents of the room: "there's a table" "here's a chair" "a lamp is on the table" etc. The recognition of (segmented) objects occurs all the time by humans whereby they can integrate and re-evaluate any given scene introduced to them. Computers, on the other hand, have a relatively difficult time to segment and identify individual pieces.

Conversely, recognition such as in optical character recognition (OCR) as well as handwriting recognition techniques involves training a recognizer to learn what defines a chair or a table, for example. Thus, computers can be trained to recognize objects according to their defined dimensions, densities, etc; however, segmentation is much more subjective. For example, various forms of printed text can be recognized by computers with a fairly high accuracy rate (e.g., over 90%). When distortion is added to printed text or letters, the accuracy rates may not be affected, if at all. However, cursive writing is much more difficult for the computers to recognize because it can be difficult to tell where each letter begins or ends.

The high performance HIPs as described in the present invention take advantage of this computer weakness at least in part by adding distortions to make characters ambiguous as well as arcs or other random clutter over parts of the characters (e.g., touching some part of at least one letter) in such a unique way as to make it very difficult for computers to "break" the HIPs. Because computer recognition capabilities continue to advance, the generation of HIPs continues to evolve. In the present invention, several new approaches are introduced to promote security of these HIPs, to make them at a faster rate, and to improve their overall effectiveness (e.g., visual appeal to a human user).

Construction of HIPs that are of practical value is difficult because it is not sufficient to develop challenges at which humans are somewhat more successful than machines. This is because there is little cost in having an automatic attacker that fails most of the time. In practice, if one wants to block automated scripts, a challenge at which humans are 99% successful and machines are 1% successful may still not be sufficient if the cost of failures and repetitions is low for a machine. Thus, to be useful, a HIP must make the cost of an automated attack high enough to discourage repeated guessing. In a strong sense, a HIP is successful if the cost of answering challenges with a machine is higher than the cost of soliciting humans to perform the same task. The invention takes advantage of the fact that an appropriately altered image may be difficult for a computer to reliably read without applying expensive techniques but may be very easily understood by humans. By including such an image as a challenge in a web page (or a computer logon/access screen) and making the submission of the page (or login) dependent of a correct answer to the challenge, scripts can be reasonably prevented from running against web pages (logging into or accessing computers).

Moreover, the invention describes new techniques for altering content, such as an image (e.g., HIP image), and an architecture for their high performance implementation with the purpose of making it hard, expensive, and unpredictable for a computer to read, while at the same time, keeping it easy to read by almost any human.

Referring now to FIG. 1, there is a general block diagram of an exemplary architecture for a HIP generation system 100 in accordance with an aspect of the present invention. The system 100 comprises a character selection component 110 that can randomly select a plurality of pre-rendered characters from a character cache 120 to form the foundation of a new HIP. The pre-rendered characters may be stored in the cache 120 in binary form for overall added security of the HIP during fabrication. The character cache 120 can include rotated and scaled versions of all allowed characters (some characters such as capital 1, digits 0, and 1, letters O and Q can be omitted) as collections of black and white bitmaps.

Furthermore, the cache 120 can be generated at startup with a unique location for each possible character with a specific x- and y-scaling and rotation. The number of bitmaps in the cache can grow to be very large. For example, if the scaling factor is between 95%-105% for both x- and y-scaling and the rotation is between −5 to +5 degrees, there could be 11*11*11*26=34,606 bitmaps for the English alphabet (all 26 upper case chars). Populating the character cache 120 (filling in all of the bitmaps) on startup is very time consuming and so lazy cache population is employed (i.e., as HIPs are generated, the characters used in these HIPs are saved in the cache). With time, the cache 120 gradually fills up.

The characters in the cache 120 can also be run-length encoded to reduce the memory footprint of all possible combinations of x- and y-scaling and rotation. Run-length encoding (RLE) is a simple form of data compression in which runs of data are stored as a single data value and count rather than as an original run. For example, consider a screen containing plain black text on a solid white background. There can be many long runs of white pixels in the blank space and many short runs of black pixels within the text.

An alternative approach uses gray scale images in the cache wherein each character is anti-aliased into the background to produce smooth edges. However, such an approach could be less secure since anti-aliasing at this stage of the process or system can make the HIP vulnerable to reverse engineering by a computer.

Once a set of random characters are selected from the character cache 120, they can be arranged in any random order to form a preliminary HIP image. An arc selection component 130 can then be employed to randomly select any number of arcs (or other types of clutter) from an arc cache 140 (or any other clutter cache, respectively). The selected arcs can be placed about or combined with the text (characters) in a random manner such as by using low discrepancy quasi random numbers to maximize interference with the subject text. For instance, the placement of a second arc can be based at least in part on the placement of a first arc and so on. This type of controlled randomness can improve the look of the HIP as well as make it more effective in distinguishing human users from computer users.

The arc cache 130 comprises a plurality of cubic splines of varying arc widths. The cubic splines can be limited to three control points. The control points for these arcs are selected uniformly at random. Furthermore, the arc cache can include foreground arcs and background arcs. Foreground arcs can essentially add ink to the HIP whereas background arcs can effectively remove ink from the HIP. In addition, foreground arcs can appear in the same color or texture as the foreground color or texture; and similarly, background arcs can appear in the same color or texture as the background color or texture.

Furthermore, arcs can be generated or added to regions of a HIP sequence or image which are relatively far away from text characters on the HIP. The HIP image size (width and height), can be made significantly large than the required space necessary to display a given number of character at a given font. This can be useful because many arcs can then be added to the image in order to fool an automatic system to think there are other characters in the image. This strategy would generate several false positives of characters in these regions. Once the characters have been placed, various arcs of variable thickness can be added safely away from the positions where the characters are. A thick arc refers to an arc whose thickness is close or larger than the average thickness of the character font used to generate the characters. From a readability standpoint, adding thick arcs uniformly is dangerous because when a thick arc overlaps a character, it is more likely to make it unreadable. A possible work-around is to add thinner arcs uniformly, and to add thicker arcs uniformly except for the restriction that they do not overlap with already placed characters. This helps with keeping the place characters legible. Since the thick arcs are close to the average thickness of the characters, they are hard to distinguish from regular characters and therefore are prime candidate for false positive which is good for diffusing attacks. The number or density of arcs added away from character can be adjusted independently.

Unlike the character cache 120, the arc cache 140 need not be very large. A few thousand arcs can suffice to generate a large number of HIPs. Thus, the arcs can be generated on startup. As with the character cache 120, the arcs can be saved as bitmaps in binary form. Similar to the character bitmaps, the arc bitmaps in the arc cache 140 can be non-anti-aliased or anti-aliased before undergoing a warping process. However, anti-aliasing before the HIP is warped can make the HIP vulnerable or susceptible to reverse engineering by a computer.

A preliminary HIP sequence or image (non-warped) can then be communicated to a warp field application component 150 which communicates with a warp sub-region selection component 160. The selection component 160 can randomly or manually select a sub-region of the warp field for use in warping the HIP. Subsequently, the warp field application component 150 can map the HIP to the selected sub-region (of the warp field). Thus, the HIP can be stretched, distorted, or otherwise made ambiguous to make it more difficult to identify particular characters in the HIP image.

The sub-region of the warp field can be randomly or manually chosen from a warp field cache 170. The warp field cache 170 consists of a large two-dimensional image (stored as a matrix of integers—each pixel has two integers associated with it to define the x- and y-dispersion) whose dimensions are several times that of a single HIP image. When a given HIP image is to undergo warping, a random contiguous sub-matrix of the size of the HIP is extracted from the warp field cache and used to warp the HIP. Application of the warp field to a HIP moves the pixels of the HIP by the amounts specified by the integers in the selected warp field sub-matrix.

The warp field cache 170 is the sum of two warp fields. The first being a global warp field and the second being a local warp field. Unfortunately, the warp fields are computationally expensive to generate. One exemplary process involves the generation of a two dimensional Gaussian field that is then low pass filtered using a two-dimensional exponential filter and quantized (rounded to the nearest integer value). The amplitude of the field is determined by the magnitude of the Gaussian field and the smoothness of the field (whether it has large smooth waves or small rough ripples) is determined by the rate at which the exponential decays.

The global warp field has a large magnitude and a high decay factor whereas the local warp field has a small magnitude and a small decay factor. As a result, the global warp field produces large smooth distortions where as the local warp field generates small rough distortions. Moreover, converting the warp field into integers eliminates the need for interpolation and results in a speedup of HIP formation.

After the HIP image has been sufficiently warped, it can undergo further processing by various components. For example, the HIP image can be warped at high resolution and then down-sampled by a factor greater than 1. This improves the visual appearance of the HIP image. In addition, texture and/or color can be added to the HIP image to further improve its visual appeal. For example, texture and at least one color can be added to the background while the foreground (e.g., at least text) can be shown in one or more different colors. HIPs 180 generated in the manner described above can be made available through a web-based service to website owners and operators who wish to control access to their site or services. However, before the final HIP images 180 can be served through a web service or website to a user's browser, the image 180 can be encoded into gif, jpeg, bmp, and the like. This allows for the generated HIP 180 to be presented and viewed through a general purpose internet browser or image viewing tool. Moreover, the addition of texture and/or color can be desirable as a means to customize the appearance of HIPs—such as per user or web service.

The system 100 can also include an optional HIP verification system 190 that can be used to monitor (human) failed HIPs as well as randomly sample HIPs generated in part by the system 100 to facilitate determining the usability of various text+arc combinations. In particular, the verification system 190 can collect live samples of HIPs or HIP signatures being served to users as well as human successes or errors as they try to answer these HIPs. This information can be used to determine success and error rates of character placement or arc placement with respect to the characters for use in building usability maps. Usability maps corresponding to characters or fonts can be employed. The initial maps can be hand generated (by a programmer or a designer based on a priori human knowledge) based on how the glyphs for the font are rendered and also the associated inter-letter/digit confusion. For example, the upper case E in Times Roman font is sensitive to background arcs that would erase any of the horizontal arms of the E. This degrades the ability to read an E. However, an independent evaluation can make a user aware that the lower horizontal arm of the E if erased would cause the E to unintentionally look like an F. Usability maps can then be used to alter the generation of future HIPs.

Moreover, one approach involves sampling human errors during on-line operation of the HIP. When HIPs are generated to identify humans, successes and errors are logged along with each HIP signature, i.e., each sampled HIP is associated with a trial wherein a human examined the HIP and tried to solve it. The HIP signature completely determines the locations and parameters of the characters and arcs that make up the HIP (with the exception of the warp field). Both successful and unsuccessful HIP solutions are logged. Since several million HIPs are served each day, random sampling might be adopted to achieve desired number of samples over a period of time without affecting the on-line system. HIP signatures in these samples can be used to regenerate the HIP before the warp step.

Next, sub-images of the regenerated HIP containing each of the characters are extracted. These sub-images are enlarged bounding boxes of the characters in the HIP. The bounding box sub-images are then rotated and scaled to get the size and orientation of the original character. As a result, any arc/arc segments that fall in this bounding box are also extracted. Each character is examined for how surrounding arcs intersect with/influence the character. The importance of the effect of the intersection of an arc with a character is clear. Even if an arc does not actually intersect a character, it can influence the interpretation of the character based on its proximity to the character (modeled by its presence in the "enlarged" bounding box). The user's errors and success are used to classify which types of intersections/influence are bad and which types are good, respectively. This can be achieved by simply keeping a count of the foreground and background arc pixels that fall within the bounding box around each character. These counts form the usability maps per character. Counts for both successful and failure cases can be collected. Along with keeping counts of interfering and/or benign pixels, their locations can be tracked as well. For instance, the counts can be tracked per location relative to where the character is positioned. As a result, a map comprising a two-dimensional representation of these counts at each possible location in the bounding box can be obtained.

Once the usability maps are built from user data, the HIP generation process can take into account these usability maps and can reject arc locations that could adversely affect the interpretation of a character. A trial and error method can be used to accept/reject arcs as they are added to the HIP. For example, the trial and error method can occur during or concurrently with arc selection (130). A cumulative score can be used to determine whether to accept/reject any given arc based on its location and shape/orientation.

Figure 2:
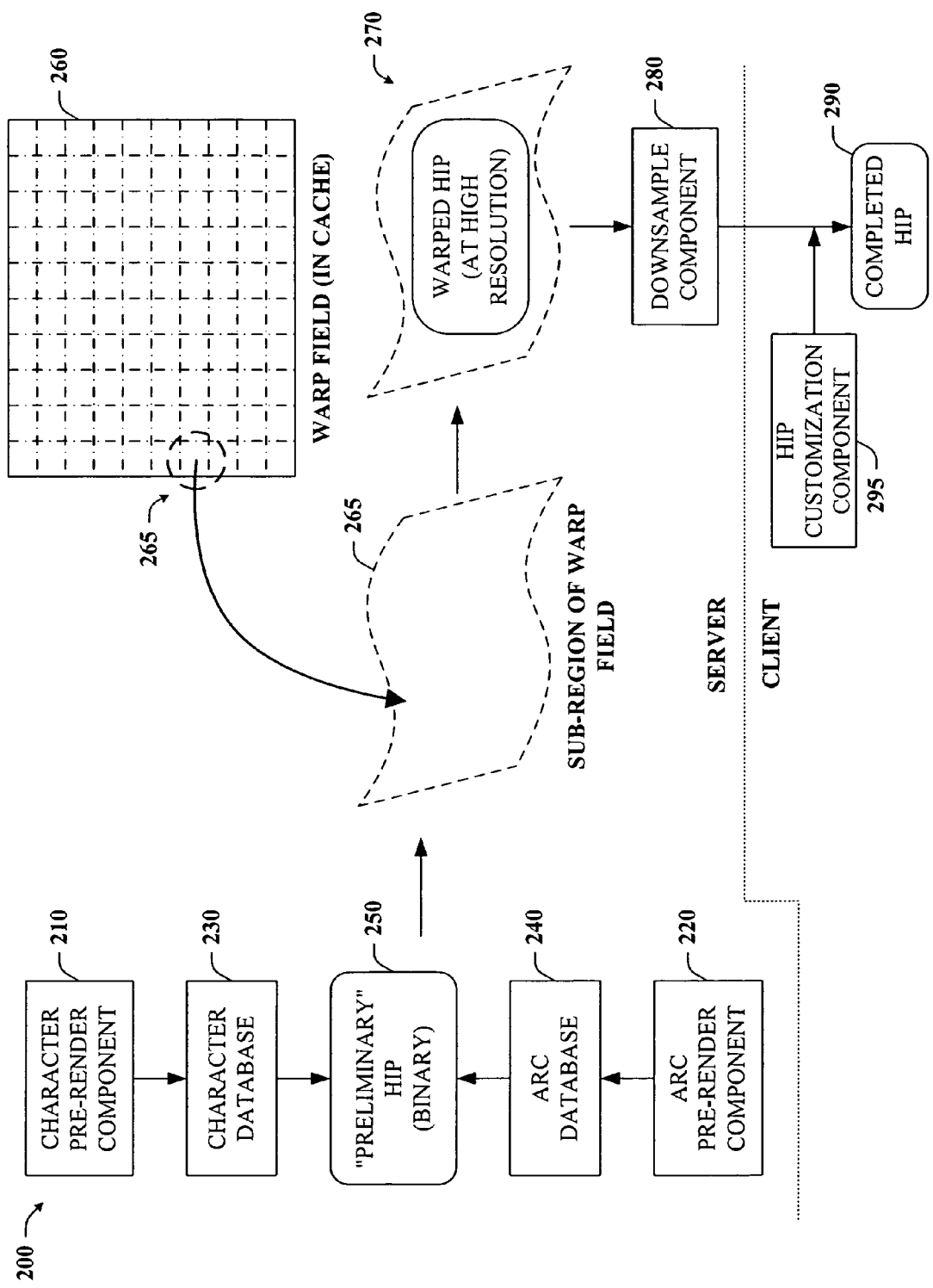
FIG. 2 is a schematic diagram of the generation of a HIP in accordance with another aspect of the present invention.

Referring now to FIG. 2, there is illustrated a schematic diagram of an exemplary pathway for HIP formation in accordance with an aspect of the present invention. Initially, a character pre-render component 210 and/or an arc pre-render component 220 can pre-render characters (e.g., letters, punctuation, and numbers) and/or arcs, respectively, and store them in the appropriate databases (e.g., character database 230, arc database 240). In particular, scaled as well as rotated characters can be individually rendered as bitmaps in binary form and then can be cached and made available for easy retrieval when composing the HIP image or character sequence. Characters which have been determined to be too difficult for humans to solve can be removed from the database as needed.

Arcs as well as other arbitrary clutter can be pre-rendered as bitmaps in binary form and then cached as well. The arc cache can include simple arcs (splines) as well as other types of clutter designed to impair segmentation and OCR programs. Examples of such clutter comprise pieces of characters from the same font as the text, arcs with serifs, and the like. Because the characters, arcs, and other arbitrary clutter are pre-rendered and then cached, HIP composition and formation can occur quite rapidly compared to conventional generation schemes.

Once composed, the preliminary HIP (pre-warp HIP) 250 can then be warped by a chosen sub-section of a warp field 260 (270). The warp field 260 can comprise or be divided into a plurality of sub-regions 265. Thus, each time a new HIP is composed, a sub-region of the warp field can be randomly selected (from the warp field cache) and applied to the preliminary HIP 250. As a result, generating a new warp field de novo each time a new HIP is generated is no longer needed, which substantially speeds up HIP generation time and consumes fewer valuable resources.

The warp field cache as well as the arc cache can be periodically refreshed to facilitate or ensure the addition of entropy to the HIP generation algorithm. For example, the frequency of cache updates can be customized and can range from once every 50 milliseconds for the warp field to once every couple of days for font, color, and texture updates. It should be appreciated that the character cache can be updated less frequently than the arc cache but should be updated at least as often as the font for the HIP changes.

As previously discussed, the subject HIP can be generated in binary form to improve security of the HIP as well as to speed up generation time. However, HIPs depicted in binary form may not be visually appealing since the edges can be choppy or rough. To address this concern, the present invention provides for down-sampling. A down-sampling component 280 can down-sample the generated HIP by any integer or non-integer greater than one (e.g., factor such as 2) or bi-cubically (e.g., makes a new pixel be the averaged state of the old pixels in all four directions; so if 3 out of 4 are turned on, then the new pixel is in the on-state). As a result of the down-sampling, the completed HIP 290 can appear more refined, as having smoother edges, and in a grayscale tone (from its previous black and white color scheme). It should be understood that the down-sampling can occur before the HIP is warped; however, this can compromise the security and integrity of the HIP.

Moreover, anti-aliasing after the HIP has been fully formed (e.g., composed and warped) can be performed at this time. This is because all of the text and arcs are already present and arranged accordingly. Thus, the anti-aliasing would occur at the level of the HIP rather than at the level of the arcs/clutter and/or at the level of the text. To further demonstrate this, imagine that the pre-rendered characters are anti-aliased (smoothly blended into background) by one or more anti-aliasing filters and a subset thereof is randomly selected for the HIP. Next, a sampling of arcs which are non-anti-aliased (agged edge artifacts are present—a staircase effect) are added to the text. Despite warping and coding the HIP in binary, the HIP can still be reverse-engineered. This is because the jagged-edges of the arcs can be distinguished from the smooth-edges of the text at least in part using anti-aliasing computations. Thus, the arcs could be at least partially segmented from the image, thereby decreasing the overall security and effectiveness of the HIP.

Now imagine that both characters and arcs are anti-aliased and then cached. The anti-aliasing of text usually differs from the anti-aliasing of arcs, even if the same anti-aliasing algorithm is used for both. When the caches have anti-aliased characters and arcs, the combination of these anti-aliased characters and arcs generates artifacts (because of the combination process) at their intersections (when an arc is laid on-top of a character). At these intersections, the anti-aliasing has properties that differ from the anti-aliasing properties at non-intersections. This difference can be exploited to identify arc-text intersection points. Information about these intersections can then be used to separate text and arcs in the HIP. Removal of even a fraction of the arcs on the HIP would reduce the security provided by the HIP, as segmentation becomes easier.

However, if the HIP is anti-aliased and reverse-engineered at the HIP level, then any action taken on any part of the image to decipher between the arcs and the text can affect the entire image in the same manner. In other words, the arc pixels cannot be distinguished from the text pixels. Hence, anti-aliasing-based operations would be ineffective at reverse-engineering the HIP.

Due to the purpose and nature of HIPs and their generation scheme, a server can be better suited to generate down-sampled, black and white HIPs at a very fast pace while maintaining security. This is because the server itself is very fast as it can use 8-bit per pixel or 1-bit per pixel representations or run-length encoded representations and operations rather than the 32-bit per pixel operations for color images. Since today's servers have 32-bit or 64-bit processors, the server speed can be further enhanced through the use of SIMD (Single Instruction Multiple Data) instructions supported by these 32-bit and 64-bit processors. For example, the systems and methods described herein can use 64-bit and 128-bit SIMD operations on 32-bit Intel® processors which are provided through MMX (Multimedia Extensions) and/or SSE (Streaming SIMD Extensions) and/or SSE2 (allows for MMX instructions to work on 128-bit data blocks) instruction sets.

In addition, GPUs (Graphical Processing Units) can be employed to perform warping processes as well as customization such as adding texture to the HIP. A GPU is a single-chip processor that is used primarily for computing 3D functions. This includes operations such as lighting effects, object transformations, and 3D motion. Because these types of calculations are rather taxing on the CPU (Central Processing Unit), the GPU can help the computer run more efficiently. Thus, as indicated in the figure, HIP formation generally can occur on a server-side of server-client architecture.

Further speedup of server-based HIP generation can be obtained by operating directly on runs of ones and zeros in the black and white HIP rather than individual pixels. The pixel operations for blitting, keying, and warping in the HIP server can be represented by associated operations on runs of pixels. The output from a run-based HIP server allows for quick encoding into GIF and other run-based image encoding schemes. This can significantly reduce encoding overhead and further improve server performance. Finally, some servers can be designated or assigned to perform certain customizations (e.g., color) for particular clients.

Client-side HIP operations can include any customization process such as adding texture, blending (e.g., foreground into background), or color to the HIP. For example, when viewing the HIP on a browser page from a client's computer, color can be seen, whereas on the server, the HIP is in grayscale. This can be a result of client modifications performed on the HIP before it is visualized to the client user. In addition, the HIP can also be anti-aliased on the client since the HIP is sufficiently secure from reverse-engineering based on its formation on the server.

Though not depicted in the figure, the server and/or server+client combination can be implemented as a web service to facilitate location independence with respect to HIP usage. More specifically, business and website owners who desire to protect their networks against automated script attacks or to otherwise control access to their computers can purchase any number of HIPs for their personal or commercial use. This can be particularly advantageous because the benefits of high performance HIP generation can be obtained without the expense or overhead costs associated with running and maintaining servers to generate them.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
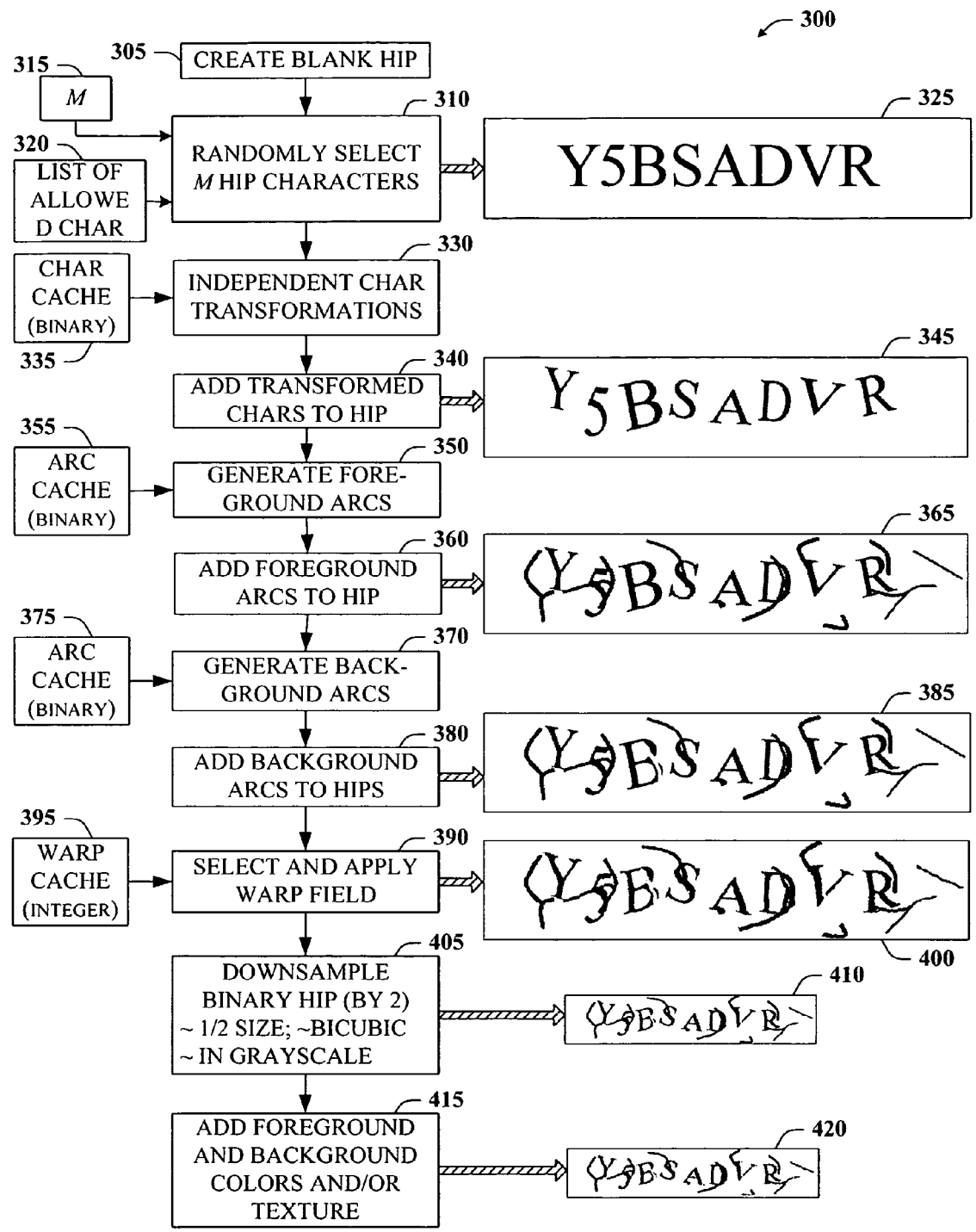
FIG. 3 is a schematic flow diagram of an exemplary HIP generation process coupled with the respective resulting HIP after various sub-processes occur in accordance with yet another aspect of the present invention.

Turning now to FIG. 3, there is illustrated a modified flow diagram of an exemplary method 300 that facilitates the generation of HIPs in accordance with an aspect of the present invention. The method 300 can begin with creating a blank HIP at 305. At 310, M number of HIP characters can be selected at random based on a pre-set HIP length M 315, wherein M is an integer greater than or equal to one. The selection of characters can be chosen from a list of allowed characters 320. A resulting HIP sequence or composition comprising Y5BSADVR is shown in 325.

At 330, independent character transformations can take place. For example, x- and y-translations, x- and y-scaling, and/or rotation about the center of a character can occur and be stored in or retrieved from a character cache 335. The characters in the cache can be maintained and used in binary form. At 340, the transformed characters can be added to the HIP as depicted at 345.

At 350, foreground arcs can be generated and stored in or retrieved from an arc cache 355 which is also maintained in binary form. Any number of foreground arcs can then be added to the HIP at 360 as illustrated in the resulting HIP 365. Likewise, at 370, background arcs can be generated and then stored for quick retrieval from an arc cache 375 similar to the foreground arc cache 355. At 380, a suitable number of background arcs can be added to the HIP as demonstrated in the resulting HIP 385. The background arcs can appear in the same color as the background as indicated in the HIP 385.

Following, a warp field can be selected and applied to the HIP 385 at 390. In particular, a random sub-region of the warp field can be selected from a warp cache 395. The resulting HIP image 400 is produced. The warping can be performed at a relatively high resolution and then down-sampled such as by a factor of 2 or any other integer or non-integer greater than 1 at 405, whereby the resulting HIP 410 is about half of its original size, for example. In addition, the resulting HIP can appear in grayscale. Finally, at 415, foreground and/or background colors and/or texture can be added to the HIP 420 as shown.

Figure 4:
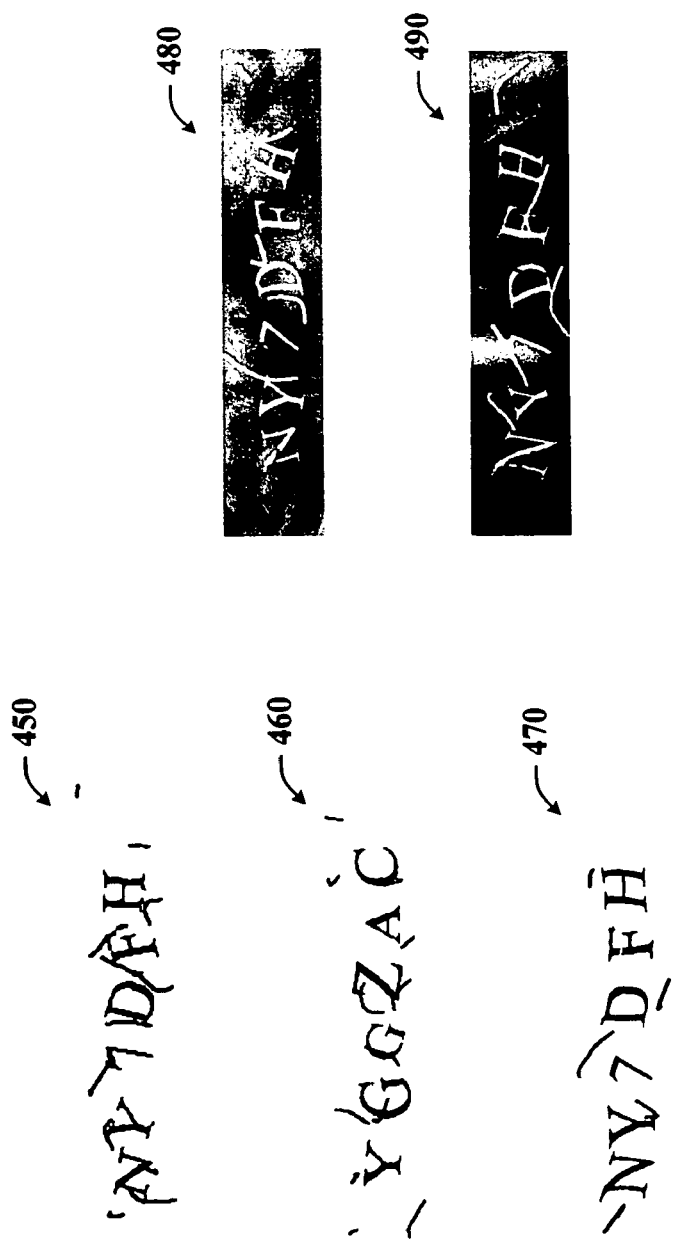
FIG. 4 illustrates exemplary HIPs formed in accordance with still another aspect of the present invention.

Exemplary HIPs generated at least in part by the present invention are illustrated in FIG. 4. In particular, HIPs 450, 460, and 470 depict high performance HIPs which include six independently transformed characters combined with various amounts of arc clutter in the foreground as well as the background. Contrasting color has been added to the foreground and background to make the HIPs more visually appealing. With respect to HIPs 480 and 490, texture, color, and color blending have been added to further enhance their appearance.

Figure 5:
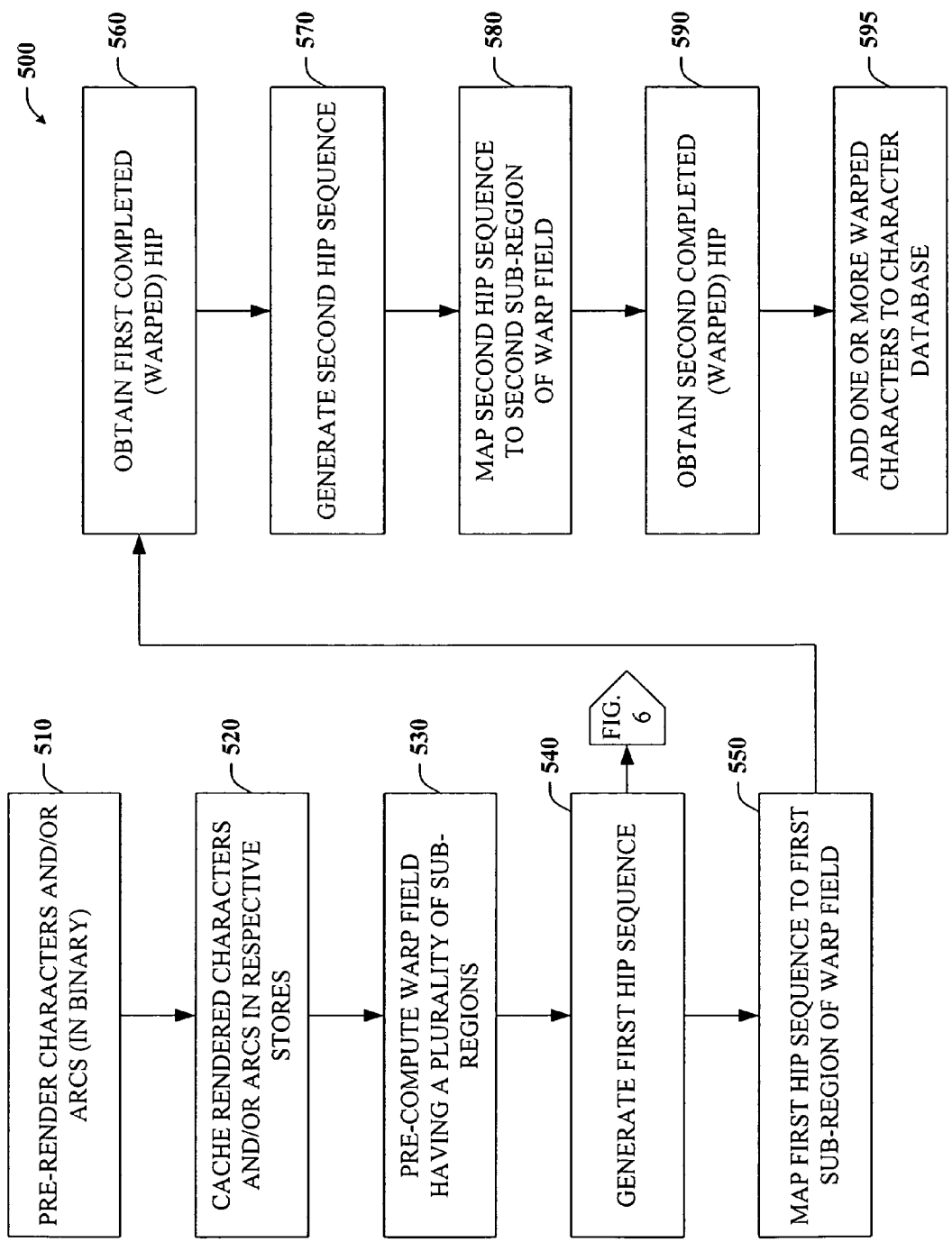
FIG. 5 is a flow diagram of an exemplary HIP generation process in accordance with an aspect of the present invention.

Turning now to FIG. 5, there is illustrated a flow diagram of an exemplary HIP generation scheme 500 in accordance with an aspect of the present invention. The method 500 involves pre-rendering a set of characters and/or arcs as bitmaps in binary form at 510. At 520, the pre-rendered characters and/or arcs can be cached in their respective stores or databases. In particular, the characters cached in a particular store can be all in the same font. In addition, the bitmap caches can be run-length encoded or encoded as GIFs or JPEG depending on the desired speed for the HIP generation process.

Caching characters, in particular, can be a rather time consuming process that can hinder the startup process. As a result, at least a subset of characters can be parsed from completed HIPs and moved to the character database to increase the number of available characters—as new HIPs are generated. Thus, the character database can be built over time. Conversely, the arc database does not require as many arcs and thus not as much time and can be built up during the startup process. Both databases can be refreshed at a particular frequency or as desired to improve the security of the HIP. However, the character database can be updated less frequently such as only when the font of the character changes or when the language changes. It should be appreciated that the HIP generation method 500 is language independent and can be extended to include arbitrary symbol sets, such as equation symbols, Lego blocks of different types, arbitrary objects such as animals and household objects, primitive geometric shapes such as those on children's toys (e.g., a HIP can be designed for school-aged children that would require identifying shapes), etc.

Next, a warp field having a plurality of sub-regions can be pre-computed in binary form and then cached in a large warp field cache at 530. Unlike conventional HIP generation schemes, the warp field in the present case can be converted to integers which can speed up HIP generation speed significantly. At 540, at least a first HIP sequence can be generated such as by using an exemplary process described in FIG. 6, infra.

The first HIP can then be mapped to at least a first sub-region of the warp field at 550 to undergo a warping process. The selected sub-region can be chosen at random and extracted from the warp field to warp this particular HIP sequence. The HIP sequence can be warped in binary form which may mean that some straight lines appear to be curved. These are indicative of jagged edge artifacts in the HIP sequence as a result of the sequence remaining in a non-anti-aliased state. To overcome the effects of the binary artifacts, the warping can be performed at a high resolution and then down-sampled to obtain a visually appealing HIP at 560.

At 570, at least a second HIP sequence can be generated and then mapped to at least a second sub-region of the same warp field at 580, which was previously employed to generate the first HIP. This second sub-region can also be selected at random and then extracted from the warp field. At 590, the finished HIP can be obtained. Following therefrom, one or more warped characters can be parsed from the HIP and then added to the character database. Otherwise, the process 500 can continue as desired to generate HIPs at a rate of at least two orders of magnitude faster than conventional HIP systems.

Figure 6:
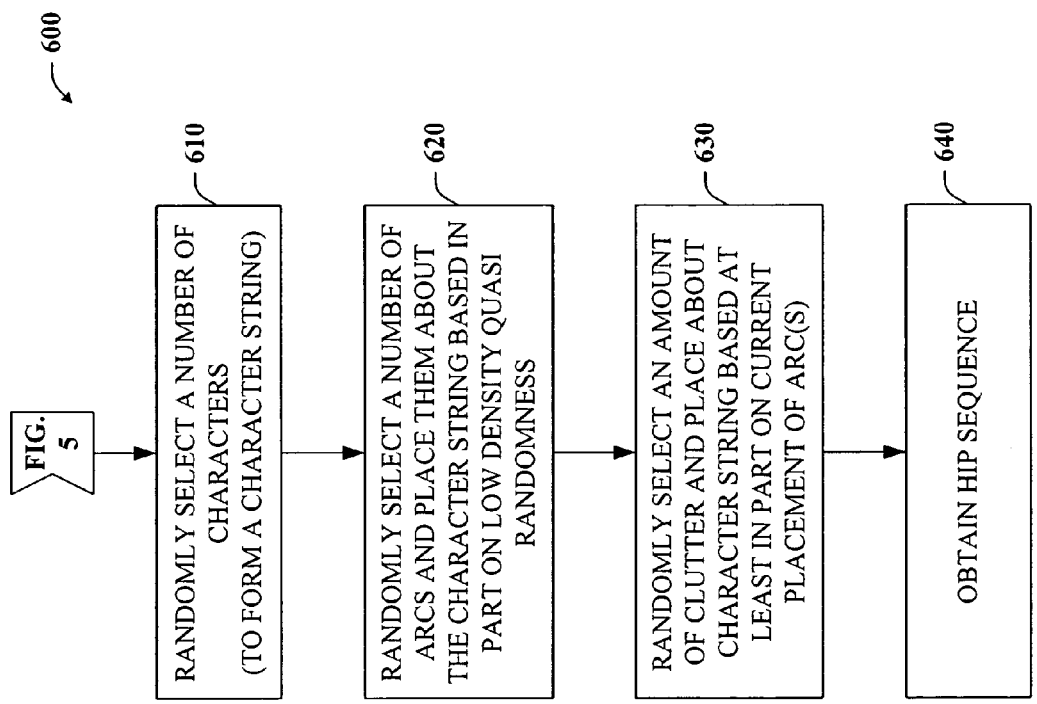
FIG. 6 is a flow diagram of an exemplary methodology for generating a raw HIP (prior to warping) in accordance with an aspect of the present invention.

Moving on to FIG. 6, there is illustrated a flow diagram of an exemplary process 600 that facilitates obtaining a HIP sequence that can be subjected to a warping process in accordance with the present invention. The process 600, as continued from FIG. 5, can involve randomly selecting any number of pre-rendered characters from a character cache at 610. For example, eight characters including letters and/or numbers can be selected from the cache. At 620, any number of background and/or foreground arcs can be randomly combined with the characters and arranged with respect to the characters based in part on using low discrepancy quasi random numbers. That is, the placement or positioning of the arcs depends on the position of previously placed arcs to minimize undesirable clumping or clustering of arcs in any one region or location of the HIP. Recall that the HIP must be solvable by humans but not by computers. Thus, this less random form of arc placement can increase rather than diminish the overall effectiveness of the HIP.

In addition, arcs can be generated or added to regions of a HIP sequence or image which are relatively far away from text characters on the HIP. The HIP image size (width and height), can be made significantly large than the required space necessary to display a given number of character at a given font. This can be useful because many arcs can then be added to the image in order to fool an automatic system to think there are other characters in the image. This strategy would generate several false positives of characters in these regions. Once the characters have been placed, various arcs of variable thickness can be added safely away from the positions where the characters are.

A thick arc refers to an arc whose thickness is close or larger than the average thickness of the character font used to generate the characters. From a readability standpoint, adding thick arcs uniformly is dangerous because when a thick arc overlaps a character, it is more likely to make it unreadable. A possible work-around is to add thinner arcs uniformly, and to add thicker arcs uniformly except for the restriction that they do not overlap with already placed characters. This helps with keeping the place characters legible. Since the thick arcs are close to the average thickness of the characters, they are hard to distinguish from regular characters and therefore are prime candidate for false positive which is good for diffusing attacks. The number or density of arcs added away from character can be adjusted independently.

At 630, an amount of arbitrary clutter can be randomly selected and also positioned on the HIP according to the current positions of the arcs. The clutter can include bits or pieces of characters obtained by cutting up characters in either a random or controlled fashion. Finally, at 640, the HIP sequence can be obtained. Variations on the exemplary eight-character HIP can include decreasing the number of characters while maintaining the HIP image size such as by increasing the amount of arcs and/or clutter. This can further improve the performance of the HIP since the HIP may appear to be the same size but contain fewer characters to solve.

Furthermore, the randomness with which characters, arcs, clutter, and sub-regions of warp fields are chosen can be determined in part by random numbers generated by random number generators which employ a plurality of random sources of entropy. The random number generators can constantly update themselves based on a variety of information that cannot be inferred or predicted or reverse engineered. For example, the types of information include how much memory is currently in use (e.g., by the server), type of data entering or leaving the network or server, and the like. The random numbers (e.g., cryptographic pseudo-random numbers) can be generated in batches and then buffered for improved performance.

Figure 7:
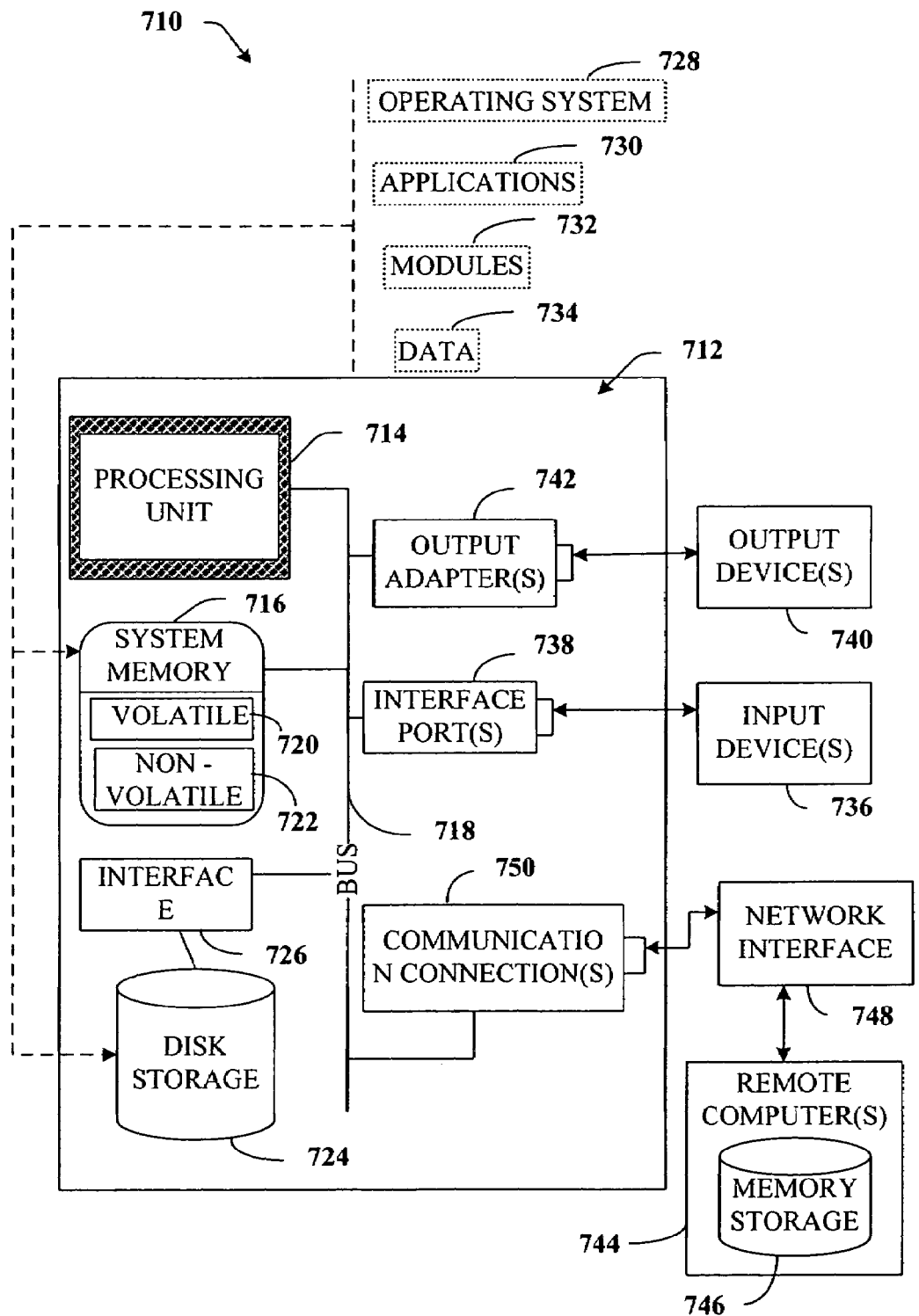
FIG. 7 illustrates an exemplary environment for implementing various aspects of the invention.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712 and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A high performance HIP generation system comprising:
at least one of a character cache component that stores a plurality of characters and an arc cache component that stores a plurality of arcs;
a warp field cache component that stores a pre-computed warp field, wherein the pre-computed, warp field comprises a plurality of sub-regions;
a component that selects any number of at least one of characters or arcs to form a binary HIP sequence; and
a warping component that maps the HIP sequence to any one of the plurality of sub-regions selected from the warp field cache to facilitate warping the HIP sequence.

2. The system of claim 1, wherein the characters are stored as bitmaps in binary form in the character cache component.

3. The system of claim 1, wherein the arcs are stored as bitmaps in binary form in the arc cache component.

4. The system of claim 1, wherein the character cache component is built up over time as HIPs are generated.

5. The system of claim 1, wherein the arc cache component comprises background arcs.

6. The system of claim 1, wherein the arc cache component comprises foreground arcs.

7. The system of claim 1, wherein the arcs are randomly combined with the characters based in part upon using low discrepancy quasi random numbers.

8. The system of claim 1, wherein the warp field cache component comprises a relatively large two-dimensional image stored as a matrix of integers whose dimensions are several times larger than that of a single HIP sequence.

9. The system of claim 8, wherein the sub-region of the warp field comprises a random contiguous sub-matrix of the size of the HIP is extracted from the warp field cache component and used to warp the HIP sequence such that a mapping of the warp field to the HIP moves pixels of the HIP by amounts specified by the integers in a selected warp field sub-matrix.

10. The system of claim 1, the warp field cache component is the sum of two warp fields.

11. The system of claim 10, wherein the two warp fields comprise a global warp field and a local warp field.

12. The system of claim 11, wherein the global warp field has a large magnitude and a high decay factor and the local warp field has a small magnitude and a small decay factor such tat the global warp field generates large smooth distortions and the local warp field generates small rough distortions.

13. The system of claim 1, wherein the warp field cache component is refreshed or updated at a frequency that facilitates maintaining an addition of entropy to the HIP generation system.

14. The system of claim 1, wherein the character cache component is updated when a font of the character changes.

15. The system of claim 1, wherein the arc cache component is updated at a frequency to facilitate maintaining an addition of entropy to the HIP generation system.

16. An advanced HIP generation system comprising a character sequence generation component that generates a HIP sequence, the HIP sequence comprising some number of characters and some amount of clutter combined with the characters; and a warping component that warps the HIP sequence at a high resolution in binary form such that a warped HIP sequence appears in black and white.

17. The system of claim 16, further comprising a customization component that adds at least one of texture, blending between a foreground and background of the HIP, and color to the HIP.

18. The system of claim 17, wherein the customization component resides on a client-side of the HIP generation system.

19. The system of claim 1, further comprising a down-sampling component that down-samples the HIP sequence after it has been warped by any factor greater than one.

20. The system of claim 19, wherein a down-sampled HIP sequence is in grayscale and smaller in size than the HIP after it has been warped.

21. The system of claim 20, wherein the down-sampled HIP sequence is anti-aliased.

22. The system of claim 19, wherein the down-sampling is bicubic.

23. The system of claim 1, wherein the arc cache component comprises a plurality of cubic splines of varying arc widths.

24. The system of claim 16, wherein the warping component comprises at least one of a graphics processing unit (GPU) and at least one of a 64-bit or a 128-bit single instruction multiple data (SIMD) operations on a 32-bit processor that are provided through at least one of multimedia extensions (MMX), streaming SIMD extensions (SSE), or streaming SIMD extensions 2 (SSE2) instruction sets.

25. The system of claim 1 resides on a saver.

26. The system of claim 1, further comprising a HIP verification system that randomly or non-randomly collects live samples of HIPs being served to users to determine error or success rates of character placement or arc placement with respect to the characters to facilitate altering fixture HIP generation.

27. The system of claim 1, wherein the character cache component comprises a plurality of scaled and/or rotated characters.

28. The system of claim 1, wherein the characters are any one of non-anti-aliased or anti-aliased.

29. The system of claim 1, wherein the HIP sequence is non-anti-aliased.

30. The system of claim 1, wherein the arcs are one of non-anti-aliased or anti-aliased.

31. The system of claim 1, further comprising at least one random generator that randomly selects any number of pre-rendered characters, pre-rendered arcs, pre-rendered clutter, and pre-computed sub-regions of a warp field.

32. The system of claim 31, wherein the random numbers are generated in batches and buffered for improved performance.

33. The system of claim 1, wherein the character cache component is encoded in at least one run-length format, jpeg format, and gif format depending on a desired speed of HIP generation.

34. The system of claim 1, wherein the character cache comprises a plurality of pre-rendered characters and the arc cache comprises a plurality of pre-rendered arcs.

35. The system of claim 1, wherein at least some arcs are randomly combined with the characters in such a way that they do not overlap with the characters.

36. A method of generating a high performance HIP comprising:
caching at least one of a plurality of pre-rendered characters to a character cache and a plurality of pre-rendered arcs to an arc cache;

caching a pre-computed warp field to a warp field cache, wherein the pre-computed warp field comprises a plurality of sub-regions;

selecting any number of pre-rendered characters and any number of arcs to form a HIP sequence; and warping the HIP sequence in part by mapping the HIP sequence to any one sub-region selected from the warp field cache.

37. The method of claim 36, wherein at least one of the characters and the arcs are pre-rendered and cached as bitmaps in binary form.

38. The method of claim 36, wherein the pre-rendered arcs comprise at least one of foreground arcs, background arcs, and arbitrary clutter, wherein the arbitrary comprises pieces of characters.

39. The method of claim 36, wherein selecting any number of pre-rendered characters and any number of pre-rendered arcs and any one sub-region is performed in a random manner.

40. The method of claim 36, further comprising randomly positioning the number of selected arcs with respect to the characters in the HIP sequence based at least in part on using low discrepancy quasi random numbers.

41. The method of claim 36, further comprising pre-computing the warp-field before it is cached to yield a matrix of integers having dimensions several times larger than the HIP sequence such that the warp-field is re-used multiple times to warp new HIP sequences.

42. The method of claim 41, wherein the plurality of sub-regions of the warp field each comprise a random contiguous sub-matrix of the size of the HIP to be employed to warp a plurality of HIP sequences.

43. The method of claim 36, wherein warping the HIP sequence comprises moving pixels of the HIP sequence by amounts specified by integers in a selected warp field sub-matrix.

44. An advance HIP generation method comprising generating a character sequence, the character sequence comprising any number of characters combined with any amount of clutter; and warping the HIP using at least one of the following:

a graphics processing unit (GPU); and at least one of a 64-bit or a 128-bit single instruction multiple data (SIMD) operations on a 32-bit processor that are provided through at least one of multimedia extensions (MMX), streaming SIMD extensions (SSE), or steaming MMD extensions 2 (SSE2) instruction sets.

45. The method of claim 36, further comprising:

updating at least one of the arc cache and the warp field cache at a frequency that facilitates maintaining an addition of entropy into the HIP generation method; and updating the character cache when a font change occurs.

46. The method of claim 36, further comprising warping the HIP sequence in binary form at a high resolution.

47. The method of claim 36, further comprising down-sampling the HIP sequence by any integral or non-integral greater than one.

48. The method of claim 47, wherein the down-sampling takes place after the HIP sequence is warped.

49. The method of claim 47, wherein the down-sampling is bi-cubic.

50. The method of claim 47, wherein down-sampling decreases a size of the HIP sequence by about half to improve visual appeal of the HIP.

51. The method of claim 47, wherein down-sampling effectively anti-aliases the HIP sequence.

52. An advanced HIP generation method comprising:

selecting any number of characters and any number of arcs to form a HIP sequence;

warping the HIP sequence to yield a HIP image for widespread distribution and use; and customizing the HIP image at least in part by adding at least one of texture and/or color to enhance an appearance of the HIP image.

53. The method of claim 52, further comprising randomly combining the arcs with the characters based in part upon using low discrepancy quasi random numbers.

54. The method of claim 52, wherein customizing the HIP image is performed by a client.

55. The method of claim 36 is performed by a sewer to maintain security and controlled access.

56. The method of claim 36, further comprising randomly generating numbers to determine random selections of pre-rendered characters and pre-rendered arcs to generate the HIP sequence and to determine random selection of the sub-region.

57. The method of claim 56, wherein the random numbers are generated in batches and buffered to improve performance.

58. The method of claim 36, wherein the character cache and the arc cache are encoded in at least one of run-length format, jpeg format, and gif format depending on a desired speed of HIP generation.

59. A data packet adapted to be transmitted between two or more computer processes facilitating improving performance and security of HIPs, the data packet comprising: information associated with caching pre-rendered characters, pre-rendered arcs, and a pre-computed warp field, generating a HIP sequence in part by randomly selecting any number of characters and arcs, and mapping the HIP sequence to a selected sub-region of the warp field to warp the HIP sequence.

60. A high performance HIP generation system comprising:

means for caching at least one of a plurality of pre-rendered characters to a character cache and a plurality of pre-rendered arcs to an arc cache;

means for caching a pre-computed warp field to a warp field cache, wherein the pre-computed warp field comprises a plurality of sub-regions;

means for selecting any number of pre-rendered characters and any number of arcs to form a HIP sequence; and means for warping the HIP sequence at a high resolution in part by mapping the HIP sequence to any one sub-region selected from the warp field cache.

61. The system of claim 60, further comprising means for down-sampling the HIP sequence after it has been warped.

62. The system of claim 60, wherein the pre-rendered characters and arcs are cached as bitmaps in binary form.

63. The system of claim 60, further comprising a means for customizing the HIP sequence after it has been warped such as by adding at least one of texture and color to the HIP sequence.

* * * * *

UNITED STATES PATENT AND TRADEMARK OFFICE
CERTIFICATE OF CORRECTION

PATENT NO. : 7,505,946 B2
APPLICATION NO. : 10/815086
DATED : March 17, 2009
INVENTOR(S) : Kumar H. Chellapilla et al.

It is certified that error appears in the above-identified patent and that said Letters Patent is hereby corrected as shown below:

In column 17, line 11, in Claim 1, delete "pre-computed," and insert -- pre-computed --, therefor.

In column 17, line 49, in Claim 12, delete "tat" and insert -- that --, therefor.

In column 18, line 29, in Claim 25, delete "saver" and insert -- server --, therefor.

In column 18, line 34, in Claim 26, delete "fixture" and insert -- future --, therefor.

In column 19, line 48, in Claim 44, delete "MMD" and insert -- SIMD --, therefor.

In column 20, line 19, in Claim 55, delete "sewer" and insert -- server --, therefor.

Signed and Sealed this
Nineteenth Day of July, 2011

David J. Kappos
*Director of the United States Patent and Trademark Office*